United States Patent [19]
Gebhardt et al.

[11] Patent Number: 5,508,687
[45] Date of Patent: Apr. 16, 1996

[54] REMOTE CONTROL, IN PARTICULAR FOR A LOCKING DEVICE

[75] Inventors: Roland Gebhardt, Heroldsberg; Guido Setzkorn, Igensdorf/Etlaswind; Georg Plasberg, Kalchreuth; Klaus Geisslinger, Leinburg; Bernhard Gumbrecht, Nuremberg, all of Germany

[73] Assignee: Diehl GmbH & Co., Nuremberg, Germany

[21] Appl. No.: 209,865

[22] Filed: Mar. 11, 1994

[30] Foreign Application Priority Data

Mar. 25, 1993 [DE] Germany .................... 9304520 U

[51] Int. Cl.⁶ .................... G06F 7/04; G08C 19/28; G08C 13/02; H04L 9/12
[52] U.S. Cl. .................... 340/825.31; 340/825.34; 340/825.65; 380/23
[58] Field of Search .................... 340/825.31, 825.34, 340/825.72, 825.69, 825.65; 380/23, 49

[56] References Cited

U.S. PATENT DOCUMENTS

| | | |
|---|---|---|
| 3,852,534 | 12/1974 | Tilk . |
| 4,509,093 | 4/1985 | Stellberger .................... 340/825.31 |
| 4,573,046 | 2/1986 | Pinnow .................... 340/825.31 |
| 4,686,529 | 8/1987 | Kleefeldt .................... 340/825.31 |
| 4,720,860 | 1/1988 | Weiss . |
| 4,723,121 | 2/1988 | van den Boom et al. .................... 340/825.31 |
| 4,727,368 | 2/1988 | Larson et al. .................... 340/825.31 |
| 4,786,900 | 11/1988 | Karasawa et al. .................... 340/825.31 |
| 4,825,210 | 4/1989 | Bachhuber et al. .................... 340/825.31 |
| 5,023,908 | 6/1991 | Weiss .................... 340/825.34 |
| 5,103,221 | 4/1992 | Memmola .................... 340/825.31 |
| 5,168,520 | 12/1992 | Weiss .................... 340/825.34 |
| 5,319,797 | 6/1994 | Salter et al. .................... 340/825.72 |
| 5,369,706 | 11/1994 | Latka .................... 340/825.69 |
| 5,412,379 | 5/1995 | Waraksa et al. .................... 340/825.31 |
| 5,420,925 | 5/1995 | Michaels .................... 380/23 |

FOREIGN PATENT DOCUMENTS 0153498  4/1985  European Pat. Off. .

OTHER PUBLICATIONS

Security Dynamics Product Brochure; 1988; Cambridge, Mass. USA; "Total Access Security".
Security Dynamics Product Brochure; 1992; Cambridge, Mass. USA; "ACM/1600".
Security Dynamics Product Brochure; 1993; Cambridge, Mass. USA; "ACE/Server".

Primary Examiner—Alyssa H. Bowler
Assistant Examiner—Mark H. Rinehart
Attorney, Agent, or Firm—Scully, Scott, Murphy & Presser

[57] ABSTRACT

A remote control for a locking device, especially in a motor vehicle, including a control or operating unit for the transmitting of key words to the evaluating circuit of a reading unit for a comparison with key words which are stored therein. The remote control arrangements are equipped with counters for the call-up in a system-time controlled manner of the key words which are stored in the control and reading units.

12 Claims, 1 Drawing Sheet

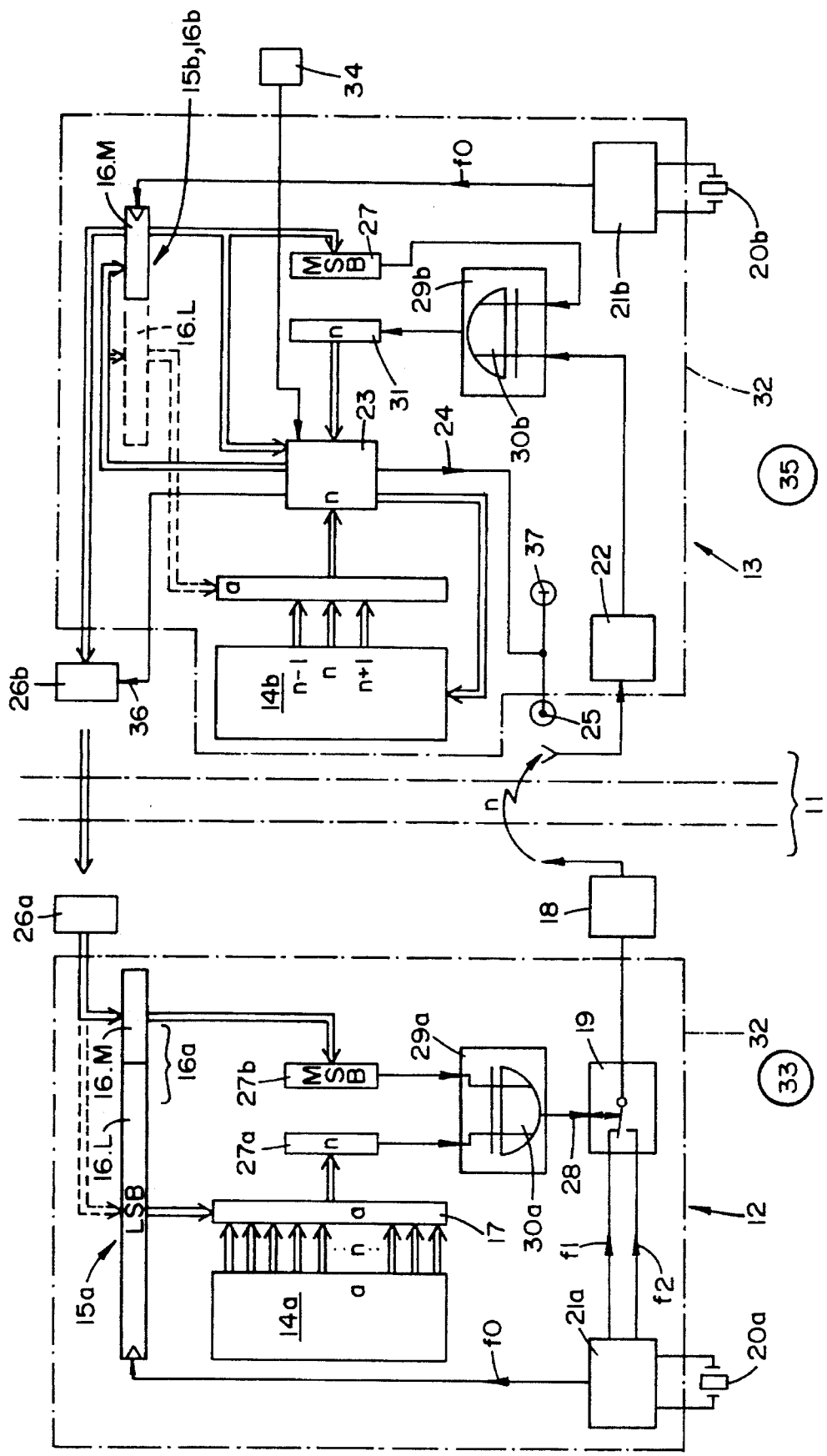

REMOTE CONTROL, IN PARTICULAR FOR A LOCKING DEVICE

BACKGROUND OF THE INVENTION

1. Field of the Invention

The present invention relates to a remote control for a locking device, especially in a motor vehicle, including a control or operating unit for the transmitting of key words to the evaluating circuit of a reading unit fora comparison with key words which are stored therein.

2. Discussion of the Prior Art

A remote control unit or arrangement of that kind is already known from the disclosure of European Laid-Open Patent Appln. No. 0 153 498 in the form of a contactless remote actuating system for door locking assemblies; and especially for the central locking arrangement employed in a motor vehicle. Upon actuation of the control or operating unit, there is emitted electromagnetic radiation, wherein this radiation is assumed by the receiver of a reading unit which is installed in the motor vehicle, in order to compare the received and demodulated key word with a stored password key word. A pulse position-modulation is employed for the transmission of the key word.

With regard to infra-red remote control or operating units which are currently available on the market for the actuation of the central locking arrangement of a motor vehicle, it is known to store different key words in the same sequence at both the transmitting end as well as at the receiving end, and to switch forward within the control unit by one memory address to the subsequently following key word after each manual actuation of the control unit. The foregoing procedure is intended to prevent an unauthorized person from gaining access to the key word which is actually being used for the opening of the vehicle, in order to be able on his part to open the vehicle through a reproduction of that key word. This is because the successive key word now differs from the previous key word, and an outsider cannot ascertain when the key word which was randomly accessed in an unauthorized manner will again be available in its series. The forward shifting of the key word within the memory of the vehicle takes place each time whenever a correct key word has been received and has led to an enable or release signal for the switching over in the condition of the locking device. However, because it is quite possible that the user of the control or operating unit actuates the switch and thereby initiates the forward switching of key word at the transmitting end, whereas, on the other hand, inexpedient transmitting conditions do not lead to a verification of this key word in the reading unit, a group of successively following key words will always be compared at the receiving end with the current or actually received key word with regard to correlation contained therein, and thereafter the address access is set, as necessary, at the receiving end to the key word which is actually applicable.

SUMMARY OF THE INVENTION

Pursuant to a development of this technology, the present invention has as a primary object the attaining of a comfortable manipulability of such a control unit, whereby this object also enables the opening to further developments in a direction towards universal applicabilities, and a greater degree of security with regard to the unauthorized appropriation of passwords or key words.

In accordance with the present invention, the above-mentioned object is essentially achieved in that the remote control arrangements are equipped with counters for the call-up in a system-time controlled manner of the key words which are stored in the control and reading units.

Pursuant to the structure as herein described, there is provided in operation a pure unidirectional signal connection with coordination of the key word comparison between unsynchronisedly autonomously operating clocks, on the one hand, in the control unit and, on the other hand, in the reading unit. Hereby, the control unit constantly emits successively following key words; however, which are only then evaluated by the reading unit when (due to the approaching movement and, possibly, an additional visual contact) there actually takes place an operationally-effective wireless transmission from the control unit to the reading unit. In any event, the user of the control unit no longer needs to carry out any kind of actuations for the activation of the locking device (for example, for unlocking the central latching device or for immobilizing the engine of a motor vehicle). It is adequate for the user of the control unit to carry with him or her the compact control unit on or in his or her clothing; and with the remote-controlled function being initiated, as soon as there is an operationally-capable transmission path present to the therewith associated reading unit. Consequently, in the control unit there is eliminated not only the demand for electrical and mechanical apparatus for an actuating switch, but additionally also a receiver for the obtention of acknowledgement information from the reading unit, whereas only a receiver but no transmitter needs to be provided in the reading unit.

The supply of key words can be stored in the memories either in an arranged manner and selected on the basis of the instantaneous internal clock time, which serves as a pointer to the memory address which is currently of interest; or instead thereof it is also possible to provide a link between the current clock time and stored key words. In any event, the control unit emits a continuous sequence of key words which are correlated with the respective clock times which are currently given internally of the equipment. As a result, at the receiving end the key word which is stored associated with that system time is compared in the reading unit with the received key word and, in the presence of a predetermined dependency (preferably in the case of a coincidence), the enable or releasing signal for the switching function of the locking device is initiated. In order to compensate for the final accuracy or the asynchronously running clocks which are internal of the system, key words are also employed for purposes of comparison at the receiving end, wherein these key words are stored at addresses which are associated with a specified time interval about the current clock time. At a positive key word comparison, there is concurrently known the time address to which the associated key word at the transmitter end belongs in the reading unit namely, due to the key word association with a given time-dependent memory address. It is, therefore, possible in the reading unit to correct the memory interrogation to the current clock time, or to correct the clock time to the key word-time value of the transmitting control unit, such that synchronism is again established between the two system-internal clocks within the bounds of the specified degree of accuracy.

Since the control unit continually cyclically emits the entire supply of the stored key words, there increases the inherent danger of someone unauthorized recording or receiving that supply of key words. However, since it is not possible to ascertain the time association merely from the key word itself, and since the system time is also not transmitted between the units, it is consequently not possible to achieve therewith any improper actuation of the locking device. An even greater degree of security is attained against the improper use when the key words are not directly emitted but only in an encoded mode. The foregoing can be achieved in an especially dependable manner with regard to circuitry through a simple logic juncture between respectively a key word which is read out serially for the modulation with an item of time information which changes so slowly that there is no gap-forming deviation from the similarly slowly changing time information at the receiving end. Sufficiently overlapping; in effect, lengthy encoding pulses are expediently derived from the most significant (highest) range of the time counter in the control unit or, respectively, in the reading unit, since therein the pulse ratios change the slowest.

BRIEF DESCRIPTION OF THE DRAWING

Additional alternatives and developments, as well as further features and advantages of the invention will now become readily apparent from the following description of a preferred embodiment of the remote control structure, having reference to the accompanying drawing in which:

The single figure of the drawing illustrates by a block circuit-diagram the cooperation between transmitter and receiver for the transmission of encoded remote-control commands.

DETAILED DESCRIPTION

The remote control 11 which is diagrammatically shown by a block circuit-diagram of the circuitry possesses at least one control unit 12 which acts in a wireless mode on at lest one reading unit 13. Both units 12, 13 are respectively equipped with code memories 14a and 14b, in each of which there is digitally stored a series of binary-coded key words or passwords n. Units 12 and 13 which are functionally associated with each other, distinguish themselves in that their respective memories 14a and 14b each contain associated (in particular, coinciding) key words n. In the control unit 12, the memory addresses a are actuated in a predetermined sequence, preferably simply in the sequence of the memory organization which is predetermined by the circuitry; for instance, by multiplexer 17, and by an internal autonomous clock 15a which is represented by a timekeeping binary counter 16a, in order that the key word n which is associated with the current internal point in time (counter condition), and resultingly the current address a can be read out and transmitted by way of a transmitter 18. For that purpose, the procedure desirably involves modulation of the natural or characteristic frequency of the transmitter 18 in conformance with the binary coding of the key word n which is presently being serially read out; essentially; for instance, the binary amplitude or pulse length modulation or (as illustrated preferably in the interest of obtaining a greater security from interference), simply a frequency-shift transmission with regard to the continuously irradiated electro-magnetic energy. The latter may be in the high-frequency spectrum, but may also involve infra-red energy which is irradiated in a modulated form. For effecting a modulation in the form of frequency shifting between the carrier frequencies f1/f2, at the input side of the transmitter 18 there is connected a change-over or reversing switch 19 which is connected at the input side to different tap-off connections of the frequency divider of a time-keeping circuit 21, the latter of which is stabilized by a quartz oscillator 20 and which also outputs the counting clock frequency f0 to the counter 16 and synchronizing pulses to registers (not shown).

The password or key word n which is currently being received in the reading unit 13 through a receiver 22 and then demodulated is compared in a processor, which serves as an evaluating circuit 23, with that one of the key words n, which is stored in the memory at the receiving end of the address a being associated with the internal point in time of that receiver. When there is a specific dependency n - n present between the received key word and the associated stored key word, for example, when there is an identity or coincidence between the two words, the evaluating circuit 23 outputs an enable signal 24 to an electro-mechanical or electro-pneumatic locking device 25, so as to; for example, cause a vehicle door to be either unlocked or locked.

However, it can also be contemplated to prepare the output of the enable signal 24 only upon coincidence or identity of the key word, and effect initiation when a given region of the vehicle is touched; for example, its door handle 34 is pressed, so as not to already produce a switching action in the locking device 25 simply because the authorized user merely passes by his vehicle 35.

Instead thereof, or in addition thereto, the enable signal 24 which is outputted at the coincidence of the password or key word, can also be transmitted to the on-board or vehicle electronics 37 in order; for instance, to release an electro-mechanical or electronic starter blocking device. This will ensure that only an authorized person (in effect, a person who carries along with him a control unit 12 operatively associated with this vehicle 35 and who has just come sufficiently close to this vehicle 35), so as to be able to not only open the vehicle 35 but then to also place it in operation.

Thus, the respective clocks 15a and 15b in the control unit 12 and in the reading unit 13 can be synchronized with each other from time to time through electro-mechanical (ohmic) or contactless (electronic) coupling circuits 26; for example, after a battery change or after a prolonged period of non-use; for instance, by transmitting the current counter condition at the receiving end to the counter at the transmitting end. In principle; however, the time-keeping circuits 21 of the control unit 12 and the reading unit 13 operate in an uncoupled mode; in effect, freely, so that from the outside it is not possible by an unauthorized person to verify any real time relationship with regard to individual key words n, because of the absence of any synchronism in running with the official time. For that reason, it is, on the other hand, not possible to preclude that the clocks 15a, 15h diverge at the transmitting end and at the receiving end in regard to the evaluation of a transmitted key word n. Therefore, the evaluating circuit 23 also assesses some key words n-1 . . . /n+1 . . . which are adjacently associated with a few of the time-defined addresses on both sides thereof, as being applicable for the output of the enable signal 24. The memory 14b at the receiving end is then set for its current condition of the counter 16 by means of the evaluating circuit 23 to the address of the key word n which is actually received, such that commencing from that moment not only the clocks 15 are synchronized again, but in essence the stored sequences of key words are synchronized in the memories 14a, 14b. It can be still expedient for the synchronization of the time-dependent association of stored key words n, that clock time which corresponds to the address a of the received and recognized key word n be transmitted at the receiving end (in effect, in the reading unit 13) from the memory 14b to the clock 15b at that location, and for the latter to be synchronized in that manner with the current time of the clock 15a at the transmitting end. In any case, the bandwidth of the key words which are treated as being correct (extending about the actually transmitted key word n) can now be concurrently narrowed in the evaluating circuit 23. This bandwidth is then again widened in dependence on time when no key word n has been received over a prolonged period, which led to the output of an enable or release signal 24, so that a greater divergence between the clocks 15a, 15b had to have taken place.

At a sufficiently frequently encountered transmission contact between the transmitter 18 and the receiver 22 there is therefore dependably avoided any divergence in the running of the two clocks 15a and 15b, which is critical from the standpoint of proper functioning, without this necessitating a bidirectional wireless communication (return signal or acknowledgement from the reading unit 13 to the control unit 12).

A substantial improvement is achieved in the operational dependability with regard to its function and with regard to an unauthorized actuation of the locking device 25 (as illustrated by the block circuit diagram of the drawing) when the counter 16a of the clock 15b at the transmitting end is interrogated only with regard to its lower valued bits 16.L (LSB) for the addressing of the key word n which is currently to be transmitted; whereas the higher valued bits 16.M (MSB) serve for the encoding of the key word n which is to be transmitted. For that purpose, there are transmitted both the current key word n and also the upper counter value MSB in parallel into a parallel-series converter 27a, and then serially read out therefrom in the manner of the operation of a shift register. The encoding of the key word n which is to be transmitted can be easily effected in that the modulation switch 19 does not switch over directly at the binary pulse of the key word n, but the modulation of the pulse series 28 is effectuated by an encoding circuit 29 which; for example, is in the form of an X-OR-member 30 which is actuated from the two converters 27a, 27b, in essence, under the linking of the binary-coded key word n with the binary-coded current upper counter value MSB.

Through intermediary of the same kind of encoding circuit 29a, the key word n which is received in encoded form is decoded in the reading unit, in that the X-OR-member 30 receiving both the information from the receiver 22, which arrives in serially demodulated form, as well as through a parallel-series converter 27b, is supplied with the same most highest valued bits MSB from the receiver clock 15b. The binary sequence of the key word n which is again unchopped downstream of the encoding circuit 29b at the receiving end is read into a series-parallel converter 31 such as to be available to the evaluating circuit 23 as parallel bus information for a comparison with the key words n which are stored in the reading unit 13.

In the reading unit 13, the low counter range 16.L is only shown by broken line in order to signify that it does not need to be actually provided from a functional standpoint inasmuch as when any applicable stored key word n is located within the predetermined current bandwidth, then the evaluating circuit 23 produces a condition of synchronism between the control unit 12 and the reading unit 13, and from here then shifts in an internal pulse the bandwidth window further beyond the stored key words n. However, important is the presence of an adequate synchronism between the higher valued bits MSB of the time counters 16 at the transmitting and receiving ends. Since the counter bits of the binary code always become lengthier towards the higher valued bits, and resultingly switch over more slowly, then the overlap in time of the successive switching conditions at the circuits 29a, 29b is always adequately afforded for the MSB-region. At a counter time pulse f0 of; for example, one second is adequate for a practical implementation of an LSB-width of 11 bits for the decoding process, so as to with normal quartz accuracy to Limit the maximum error to about 1500 seconds per year (out of 31.5 millions of seconds per year). As illustrated, this divergence in the LSB-region of free-runningly operated counters 16 is compensated for by the bandwidth of the key words n which are still taken into consideration for evaluation in the reading unit 13 about the current LSB-address a, whereupon there again is effected the counter synchronization on the basis of the key word n which is currently recognized as being applicable.

Practically the entire extent of the circuitry of the control unit 12 can be implemented in a circuit arrangement 32 (ASIC) as specified by a customer, and only the quartz oscillator 20, the output element of the transmitter 18, and the interface of the coupling circuit 26 are to be applied from externally. However, overall for the control unit 12 (including its replaceable battery as the operating voltage source) there is obtained a volume; for example, somewhat that of a large-sized button 33, so that the control unit 12 can be simply carried by the user in a pocket or attached to an article of clothing. The transmission parameters with regard to the reading unit are designed in connection with the transmission energy and/or transmission spectrum such that, notwithstanding of key words being constantly read out of the memory 14a in a cyclical sequence, a key word transmission consists only in close proximity with and possibly even a visual communication between the transmitter 18 and the receiver 22 (in essence, the irradiation and receiving elements thereof, shown as antennae in the drawing). Only then, and for only as long as key words n which are successively called up from the transmitter memory 14a, are these transmitted and compared with the sequence of key words n which are stored at the receiving end, in order to initiate the enable signal 24 when there is case of coincidence. In the presence of a greater distance between the control unit 12 and the reading unit 13, or if there is no coincidence between the stored key words n, an enable signal 24 will not appear, and there is no change in the condition of the locking device 25.

Any manual activity is only required for effecting the synchronization between the coupling circuits 26a, 26b; for example, when first placing into operation a control unit 12 which is still neutral and which does not as yet have any sequence of passwords or key words stored therein. When this control unit 12 is in the future to be associated with a specific reading unit 13, then the sequence of key words n which is stored therein is read in by means of the coupling circuits 26a, 26b into the memory 14a of the control unit 12 from which the current clock time counter condition is transmitted, such that the paired association is fixed for future use. Any improper interrogation and transmission of the supply of key words n which is generally stored in a motor vehicle 35 can be inhibited in that the call-up through the coupling circuit 26 is possible only in connection with further operations, about which only special workshops are knowledgeable; for example, such as a given sequence of actuation of electrical switches which are provided in the vehicle instrument panel for other purposes, within a limited period of time, immediately after connection of the cable harness of the motor vehicle to the starter battery. In the drawing, this is symbolically considered in the reading unit 13 by an initiation signal 36 which is transmitted from the evaluating circuit 23 to the coupling circuit 26.

What is claimed is:

1. A remote control arrangement for a locking installation, wherein said arrangement comprises:
   a control unit comprising:
   a first memory for storing key words,
   a first clock, and
   a first counter, said first clock driving said first counter, which produces a first count having lower significant bits and higher significant bits, wherein the lower significant bits of the first count form an address to read out a first key word from the first memory corresponding to the lower significant bits, which is combined with the higher significant bits of the first count to form an encoded key word which is transmitted by the control unit; and
   a reading unit comprising:
   a second memory for storing key words,
   an evaluating circuit,
   a second clock,
   a second counter, said second clock driving said second counter, which produces a second count having lower significant bits and higher significant bits, and wherein the lower significant bits of the second count form an address to read out at least one valid key word from the second memory corresponding to the lower significant bits, and the higher significant bits of the second count are provided to said evaluating circuit;
   wherein said evaluating circuit receives and combines said transmitted encoded key word with said provided higher significant bits to form a decoded key word for comparison with said valid key words;
   said reading unit further comprising means to enable at a positive key word comparison recognition of correlation between valid key words and an associated transmitted encoded key word, such that in the reading unit there is corrected a memory interrogation to current clock time or the clock time is corrected to a key word-value of a transmitting control unit to re-establish synchronism between said first and second clocks within the bounds of a predetermined degree of accuracy.

2. A remote control arrangement as claimed in claim 1, wherein said reading unit, upon coincidence of a decoded key word in the reading unit and a valid key word stored in said memory of said reading unit, corrects the second counter of said reading unit to the point in time which is associated with the address of said decoded key word.

3. A remote control arrangement as claimed in claim 1, wherein said reading unit comprises means for comparing a decoded key word with a sequence of stored valid key words associated with successive points in time, the width of said sequence being reduced upon a coincidence of said decoded and valid key words and thereafter increased in dependence upon time.

4. A remote control arrangement as claimed in claim 1, wherein said control unit continuously emits a sequence of stored first key words, and forms a wireless coupling with the reading unit only in the event of either a close approach or a specific mutual orientation.

5. A remote control arrangement as claimed in claim 1, wherein said control unit and said reading unit each comprise coupling circuits for the direct transmission of a current system time and for the direct transmission of the valid key word memory content.

6. A remote control arrangement as claimed in claim 1, wherein the control unit includes means for frequency shifting of the carrier frequency for electro-magnetic radiation energy transmitted from the control unit to the reading unit in a sequence of the binary coding of the encoded key word which is serially read out and which is to be currently transmitted.

7. A remote control arrangement as claimed in claim 6, wherein said control unit and said reading unit each comprise a coding circuit for randomly blanking out and reconstructing the pulse sequence of the binary coding of a key word.

8. A remote control arrangement as claimed in claim 1, wherein the arrangement provides for time-dependent encoding and decoding which is quasi-synchronous in operation with respect to the currently transmitted encoded key word, wherein during the quasi-synchronous operation upon synchronism of the clocks of the control unit and the receiving unit, the bandwidth of valid key words treated as being correct is narrowed, and when a valid key word treated as being correct has not been received over a prolonged period of time, the bandwidth of valid key words treated as being correct is widened.

9. A remote control arrangement as claimed in claim 6, wherein lower significant bits of the first clock counter are provided for address advance when the first key word is read out of the first memory while higher significant bits of the first counter are logically linked after a parallel-series conversion in a coding circuit to the binary series which is to be serially read out as the encoded key word.

10. A remote control arrangement as claimed in claim 6, wherein an X-OR member is provided in both the control unit and the reading unit for encoding or blanking-out of the binary sequence of respectively the encoded and decoded key word in accordance with the serial sequence of binary numbers which overlap each other over time in the control unit and in the reading unit and which progress at a comparatively slow rate.

11. A remote control arrangement as claimed in claim 1, wherein in the reading unit, upon coincidence between the decoded key word with one of the stored valid key words, an enable signal is transmitted to a locking device of a central locking installation of a motor vehicle.

12. A remote control arrangement as claimed in claim 11, wherein the enable signal is transmitted to on-board electronics of a motor vehicle for unlocking an engine starting device.

* * * * *